(12) United States Patent
Cooper et al.

(10) Patent No.: US 11,650,425 B2
(45) Date of Patent: May 16, 2023

(54) METHOD, COMPUTER PROGRAM PRODUCT AND BINOCULAR HEADSET CONTROLLER

(71) Applicant: Tobii AB, Danderyd (SE)

(72) Inventors: Geoffrey Cooper, Danderyd (SE);
Rickard Lundahl, Danderyd (SE);
Erik Lindén, Danderyd (SE); Maria Gordon, Danderyd (SE)

(73) Assignee: Tobii AB, Danderyd (SE)

( * ) Notice: Subject to any disclaimer, the term of this patent is extended or adjusted under 35 U.S.C. 154(b) by 181 days.

(21) Appl. No.: 17/128,424

(22) Filed: Dec. 21, 2020

(65) Prior Publication Data
US 2021/0255462 A1 Aug. 19, 2021

(30) Foreign Application Priority Data
Dec. 20, 2019 (SE) .................................. 1951542-8

(51) Int. Cl.
*G02B 27/01* (2006.01)
*G06F 3/01* (2006.01)
(Continued)

(52) U.S. Cl.
CPC ......... *G02B 27/0172* (2013.01); *G06F 3/013* (2013.01); *G02B 2027/0134* (2013.01);
(Continued)

(58) Field of Classification Search
USPC ........................................................ 359/630
See application file for complete search history.

(56) References Cited

U.S. PATENT DOCUMENTS 10,012,506 B1 * 7/2018 Monahan ............... G01C 21/20
2012/0293407 A1 * 11/2012 Lee ...................... G02B 27/017
345/156
(Continued)

FOREIGN PATENT DOCUMENTS

WO 2016073986 5/2016
WO 2017058495 4/2017
(Continued)

OTHER PUBLICATIONS

Swedish Search Report and Written Opinion of 1951542-8, dated Sep. 10, 2020.

*Primary Examiner* — Chineyere D Wills-Burns
(74) *Attorney, Agent, or Firm* — Noréns Patentbyrå AB

(57) ABSTRACT

Computer-generated image data is presented on first and second displays of a binocular headset presuming that a user's left and right eyes are located at first and second positions relative to the first and second displays respectively. At least one updated version of the image data is presented, which is rendered presuming that at least one of the user's left and right eyes is located at a position different from the first and second positions respectively in at least one spatial dimension. In response thereto, a user-generated feedback signal is received expressing either: a quality measure of the updated version of the computer-generated image data relative to computer-generated image data presented previously; or a confirmation command. The steps of presenting the updated version of the computer-generated image data and receiving the user-generated feedback signal are repeated until the confirmation command is received. The first and second positions are defined based on the user-generated feedback signal.

19 Claims, 4 Drawing Sheets

(51) Int. Cl.
    *G02B 27/00*     (2006.01)
    *G06F 3/14*     (2006.01)
    *G06T 19/00*     (2011.01)

(52) U.S. Cl.
    CPC ............... *G02B 2027/0178* (2013.01); *G02B 2027/0198* (2013.01)

(56) References Cited

U.S. PATENT DOCUMENTS

| | | | | |
|---|---|---|---|---|
| 2016/0303373 | A1* | 10/2016 | Dorn | A61N 1/37241 |
| 2017/0017834 | A1* | 1/2017 | Sabitov | G06V 20/52 |
| 2017/0122725 | A1 | 5/2017 | Yeoh et al. | |
| 2017/0241017 | A1* | 8/2017 | Miyamoto | C23C 16/458 |
| 2017/0249009 | A1* | 8/2017 | Parshionikar | G06V 40/176 |
| 2017/0336631 | A1* | 11/2017 | Armstrong | H04N 23/00 |
| 2018/0284758 | A1* | 10/2018 | Celia | H04B 17/23 |
| 2018/0373318 | A1 | 12/2018 | Yang | |
| 2019/0222830 | A1 | 7/2019 | Ernest | |
| 2019/0265802 | A1* | 8/2019 | Parshionikar | G06F 3/012 |
| 2019/0324444 | A1* | 10/2019 | Celia | G06N 3/088 |

FOREIGN PATENT DOCUMENTS

| | | |
|---|---|---|
| WO | 2017062289 | 4/2017 |
| WO | 2018129234 | 7/2018 |
| WO | 2019014285 | 1/2019 |
| WO | 2020023672 | 1/2020 |
| WO | 2020102665 | 5/2020 |

\* cited by examiner

METHOD, COMPUTER PROGRAM PRODUCT AND BINOCULAR HEADSET CONTROLLER

CROSS-REFERENCE TO RELATED APPLICATION

The present application claims benefit to Swedish patent application No. 1951542-8, filed Dec. 20, 2019, entitled "Method, Computer Program Product and Binocular Headset Controller", and is hereby incorporated by reference in its entirety.

TECHNICAL FIELD

The invention relates generally to presentation of virtual- or augmented reality graphics to a user via a head mounted display. In particular, the instant invention concerns a method for calibrating a computer graphics presentation to match the specific eye positions of the user wearing a binocular headset and a controller configured to implement such a method. The invention also relates to a computer program product and a non-volatile data carrier.

BACKGROUND

A head mounted display (HMD) contains two displays—one for each of a user's two eyes. From a system point-of-view, however, the HMD may be regarded to contain two virtual cameras through which a virtual environment is regarded. Here, one virtual camera represents a user's right eye and the other virtual camera represents the user's left eye. To render the graphics and present it to the user in a fully consistent and coherent manner, each virtual camera must be positioned where the user's respective eye is actually located. This is a requirement for the virtual objects to appear where they are intended to appear in the environment that is presented to the user.

In a single-focal-plane headset, which most of today's HMDs are, an incorrect virtual camera position results in that the objects being rendered are consistently offset in at least one dimension, i.e. vertically, horizontally and/or depth wise. Typically, in a closed virtual reality headset, this is not a major cause of concern. However, in applications where the user is supposed to interact with the virtual environment, for example using his/her hands in close-to-eye interactions, the position mismatch risks resulting in erroneous movements, eyestrain and/or eye fatigue.

In an augmented reality (AR) application, where the user observes the real world through a see-through display together with various computer-rendered virtual objects, the user will not perceive the virtual objects as aligned with the real world objects if the virtual camera position is off relative to the position of the user's eye.

In an AR HMD with two focal planes, the computer-rendered content is displayed either on a close focal plane or on a far focal plane. This enhances the user's impression of depth. To further improve this experience, so co-called varifocal technique can be applied. A varifocal display has a single focal plane, that adjusts its focal distance dependent on what the user currently is focusing on. Both these types of multi-focal distance technologies suffer from the problems described above with reference to misalignment for a single focal plane. In addition to that, if in a multi-focal distance design, the virtual camera position is incorrect, the virtual content will also move around when the location of the focal plane changes. This is illustrated in FIGS. 9a and 9b and will be discussed below in the detailed description.

The difference between a single focal plane display and a varifocal plane display is that for a given stereoscopic distance at which the user focuses—the so-called virtual image distance—in the varifocal case the focal distance adapts to the virtual image distance; whereas in the single focal case the focal distance remains unchanged. Even though the user may not be consciously aware of this difference, over time, a user interacting with a single focal design will normally experience eye fatigue and eyestrain.

Depending on the spatial direction in which the virtual camera is offset relative to the eye position, different misalignments and movements of the virtual content will occur. If, for example, the horizontal and/or vertical position is incorrect, misalignment and movement will happen in vertical and/or horizontal direction. If instead, position is incorrect in depth, the direction(s) of the misalignment will depend on where on the screen, relative to the eye, a rendered virtual object is displayed. Erroneous spatial positions for the virtual camera may also be expressed in terms of an incorrect interpupillary distance (IPD) for the eyes, i.e. as a distance vector between the eyes.

An incorrect virtual camera position becomes apparent to the user in the form of misaligned virtual objects. In a varifocal or multiple focal plane design, an incorrect virtual camera position will express itself as inadvertent movement of virtual objects when the focal plane is changed. Referring to FIGS. 5 and 6, we will describe these two effects below.

When the virtual camera positions are correct for a user's both eyes, two virtual objects can be rendered at different distances in such a manner that the two objects completely overlap one another. For example, a first cube at a shorter distance can be rendered to obscure the user's view of a second cube rendered at a longer distance. Provided a particular relationship between the magnitudes of the shorter and longer distances and the sizes of two virtual objects, for example in the form of first and second cubes 500/501 and 600/601, the virtual objects can be rendered to be perceived by the user as perfectly overlapping one another. If, however, at least one of the virtual cameras' positions is incorrect in a horizontal direction x in relation the display, there will be a horizontal misalignment $d_x$ between the virtual objects 500 and 501. Analogously, if at least one of the virtual cameras' positions is incorrect in a vertical direction y in relation the display, there will be a vertical misalignment $d_y$ between the virtual objects 600 and 601.

If the model used when rendering the virtual graphics assumes an incorrect distance between the eye's rotation center and the pupil, the user will experience misalignments in the peripheral view field. This effect will be discussed below in the detailed description referring to FIGS. 4 and 8.

U.S. Pat. No. 10,416,766 describes a solution for varying focus and prescription correction in VR and AR systems. Here, an HMD that includes an electronic display is configured to emit image light, an optical assembly that provides optical correction to the image light, an eye tracking system, and a varifocal module. The optical assembly includes a back optical element configured to receive the image light from the electronic display, and a coupling assembly configured to couple a front optical element to a location within the optical assembly such that the front optical element receives light transmitted by the back optical element. The optical correction is determined in part by an optical characteristic of the front optical element that is replaceable. The eye tracking system determines eye tracking information for a first eye of a user of the HMD. A varifocal module adjusts focus of images displayed on the electronic display, based on the eye tracking information and the optical correction.

US 2019/0179409 discloses an HMD design that provides the user with a wide field of view and high image resolution whilst also offering a large exit pupil for eye placement with sufficient eye clearance. Individual users' varying needs as to general task at-hand, visual focus, and various regions-of-interest within their field of view are addressed. Inter alia, during fitting of the HMD, the user may be presented with reference images, wherein a so-called MicroDisplay position is adjusted and user feedback is employed to establish a preferred position.

The above documents relate to different aspects of VR/AR systems and how to adjust an HMD to fit a particular user. However, there is yet no solution that enables a user to inform the system about the virtual-camera positions to use in order to minimize avoidable rendering artefacts and to lessen any eye straining behavior of the graphics being presented.

SUMMARY

It is therefore an object of the present invention to offer an efficient and user-friendly solution for calibrating a graphics rendering engine in a VR/AR system to the specific eye positions of the user who is wearing a binocular headset via which the VR/AR environment is presented to the user.

According to one aspect of the invention, this object is achieved by a method performed in at least one processor, which method involves presenting computer-generated image data on first and second displays of a binocular headset. The computer-generated image data is rendered under a presumption that a user's left eye is located at a first position relative to the first display and the user's right eye is located at a second position relative to the second display. It is further presumed that the computer-generated image data contains at least one graphical element that is shown on the first and second displays respectively. The method also involves presenting at least one updated version of the computer-generated image data that is rendered under the presumption that the user's left eye and/or right eye is located at a position being different from the first and second positions respectively in at least one spatial dimension. A user-generated feedback signal is received, which contains either a quality measure or a confirmation command. The quality measure expresses the user's perception of the updated version of the computer-generated image data relative to computer-generated image data presented previously on the first and second displays. The quality measure may for example expresses a degree of misalignment between the computer-generated image data and the updated version thereof, and/or a degree of skewedness between the computer-generated image data and the updated version thereof. The user-generated feedback signal may be generated via a user input produced in response to manipulation of a button, a key or a touch sensor, controlling a pointing device, interaction with a gesture interface, and/or interaction with a voice interface. The steps of presenting the updated version of the computer-generated image data and receiving the user-generated feedback signal are iterated until the user-generated feedback signal containing the confirmation command is received. The first and second positions for the user's eyes are defined based on the user-generated feedback signal, preferably as the respective positions presumed latest before receiving the confirmation command.

This method is advantageous because guides the user to identify suitable positions for the virtual cameras in an intuitive and time-efficient manner.

According to one embodiment of this aspect of the invention, the method involves presenting two or more updated versions of the computer-generated image data before receiving the user-generated feedback signal.

For instance, repeatedly updated versions of the computer-generated image data may be presented, and user indicates, via the feedback signal, if the updates begin to produce an improved result, or vice versa. This can be advantageous if it is relatively straightforward to foresee which modifications of the virtual-camera positions that will lead to an improved user experience.

According to another embodiment of this aspect of the invention, a subsequent presenting of the updated version of the computer-generated image data is based on the received quality measure in such a manner that the subsequent presenting is expected to result in a later received user-generated feedback signal containing a further improved quality measure, or the confirmation command. In other words, such an updated version of the computer-generated image data is generated which is estimated to improve the matching between the user eye position and the virtual camera position. Alternatively, a subsequent presenting of the updated version of the computer-generated image data may instead be based on the quality measure in such a manner that the subsequent presenting is expected to result in a later received user-generated feedback signal containing a lower quality measure. This strategy may be applied to investigate the position of the point beyond which no further improvement is possible.

According to yet another embodiment of this aspect of the invention, an estimated left eye position for the user is assigned based on the latest first position presumed when rendering the computer-generated image data before receiving the confirmation command; and an estimated right eye position for the user is assigned based on the latest second position presumed when rendering the computer-generated image data before receiving the confirmation command. This means that the left eye position determined prior to determining the right eye position. Of course, the eye positions may equally well be determined in the opposite order. In any case, the steps of presenting the updated version of the computer-generated image data and receiving the user-generated feedback signal are iterated until a user-generated feedback signal containing the confirmation command is received for one eye of the user's left and right eyes before starting to iterate the steps of presenting the updated version of the computer-generated image data and receiving the user-generated feedback signal for the other eye of the user's left and right eyes. Such a serial approach may be beneficial in some cases.

For example, the computer-generated image data may be presented for the user's left and right eyes in a temporal parallel manner. Alternatively, the computer-generated image data may be presented for the user's left and right eyes in a temporal interleaved manner, wherein at least one iteration of presenting the updated version of the computer-generated image data and receiving the user-generated feedback signal is completed for a first eye of the user's left and right eyes, and thereafter at least one iteration of presenting the updated version of the computer-generated image data and receiving the user-generated feedback signal is completed for a second eye of the user's left and right eyes. Then, at least one iteration of presenting the updated version of the computer-generated image data and receiving the user-generated feedback signal is again completed for the first eye. Depending on how much the virtual-camera position must be adjusted, thus strategy may be advantageous.

The step of presenting the at least one updated version of the computer-generated image data may involve presenting a graphical element at a position being different from the first and second positions respectively in a first spatial dimension. Analogously, the step of presenting the at least one updated version of the computer-generated image data may involve presenting a graphical element at a position being different from the first and second positions respectively in a second spatial dimension being orthogonal to the first spatial dimension. These strategies are resourceful ways to find a suitable position for the virtual camera in the horizontal and vertical directions.

According to another embodiment of this aspect of the invention, the step of presenting the computer-generated image data on the first and second displays involves: presenting a first graphical element at a first focal plane on the first and second displays respectively; and presenting a second graphical element at a second focal plane on the first and second displays respectively. Here, the quality measure in the user-generated feedback signal is configured to indicate if the presenting of the first and second graphical elements at the first and second focal planes respectively is perceived by the user as a change in position of the first and second graphical elements. Thus, horizontal and vertical misalignments between the eye positions and the virtual camera positions can be investigated in a multi-focal distance implementation.

According to embodiments of this aspect of the invention, the graphical element presented to the user may have a rectilinear shape or another type of shape extending in two dimensions across each of the first and second displays respectively. If a number of graphical elements are presented, which each has a rectilinear shape and extends in two dimensions, the method may involve presenting the number of graphical elements as elements in at least one array, for example in the form of a horizontal line, a vertical line or a matrix of elements. Moreover, in such a case, the method may involve presenting the number of graphical elements as elements in a geometric symbol being mirror symmetric about at least two mutually orthogonal axes. Namely, this facilitates determining horizontal and vertical offsets between the virtual camera positions and the eye positions.

According to yet another embodiment of this aspect of the invention, after having received the confirmation command, the method further involves calculating an estimated inter-pupillary distance (IPD) between the estimated left and right eye positions for the user. The estimated IPD is calculated as an absolute distance between first and second coordinates, where the first coordinate expresses the first position of a pupil of the user's left eye relative to the first display and the second coordinate expressing the second position a pupil of the user's right eye relative to the second display. The estimated IPD may be a practical measure when regarding the spatial interrelationship between the user's eyes.

According to still another embodiment of this aspect of the invention, the step of presenting the computer-generated image data on the first and second displays involves presenting a two-dimensional pattern of graphical elements at one and the same first focal distance on the first and second displays. The two-dimensional pattern is presented under a presumption that, for at least one of the user's left and right eyes, a center-pupil distance separates a position of an eye rotation center from a position of a pupil of the user's eye. Here, the quality measure reflects a degree of mismatch perceived by the user between the two-dimensional pattern presented on the first display and the two-dimensional pattern presented on the second display when the user focuses his/her gaze at a predefined point in the two-dimensional pattern. In response to the quality measure, the step of presenting the updated version of the computer-generated image data involves presenting the two-dimensional pattern of graphical elements under the presumption that the center-pupil distance is different from a previously assigned measure for this distance, for example somewhat shorter. The method continues with repeated updates of the two-dimensional pattern under different presumed center-pupil distances until the user-generated feedback signal is received. After having received this signal, the method involves assigning an estimated center-pupil distance for the at least one of the user's left and right eyes to the center-pupil distance that was presumed latest before receiving the confirmation command. Thus, the user's center-pupil distance can be determined in an efficient and straightforward manner.

According to further embodiments of this aspect of the invention, the computer-generated image data is presented for the user's left and right eyes either in a temporal parallel manner, or in a temporal interleaved manner. In the latter case, at least one iteration of presenting the updated version of the computer-generated image data and receiving the user-generated feedback signal is completed for a first eye, and thereafter at least one iteration of presenting the updated version of the computer-generated image data and receiving the user-generated feedback signal is completed for a second eye. Then, at least one iteration of presenting the updated version of the computer-generated image data and receiving the user-generated feedback signal is again completed for the first eye. Such an alternately progressing approach may be especially advantageous if the distances between the initially presumed eye positions and the actual eye positions are relatively large.

According to still another embodiment of this aspect of the invention, the step of presenting the computer-generated image data on the first and second displays involves presenting a two-dimensional pattern of graphical elements at one and the same second focal distance on the first and second displays which focal distance is different the above-mentioned same first focal distance. The two-dimensional pattern is presented under a presumption that, for at least one of the user's left and right eyes, the assigned estimated center-pupil distance separates the position of the eye rotation center from the position of the pupil of the user's eye. In response to the quality measure, the step of presenting the updated version of the computer-generated image data involves presenting the two-dimensional pattern of graphical elements under the presumption that the center-pupil distance is different from a previously assigned estimated center-pupil distance. The method continues with repeated updates of the two-dimensional pattern under different presumed center-pupil distances until the user-generated feedback signal is received. After having received the confirmation command, an enhanced estimated center-pupil distance is assigned for the at least one of the user's left and right eyes, which is set to the value presumed latest before receiving the confirmation command. Hence, an initially assigned center-pupil distance can be fine calibrated with respect to another focal distance.

According to another aspect of the invention, the object is achieved by a computer program product loadable into a non-volatile data carrier being communicatively connected to at least one processor. The computer program product contains software configured to, when the computer program product is run on the at least one processing circuitry, cause the at least one processing circuitry to present computer-generated image data on first and second displays of a binocular headset, the computer-generated image data is rendered under a presumption that a user's left eye is located at a first position relative to the first display and the user's right eye is located at a second position relative to the second display. The computer-generated image data contains at least one graphical element that is shown on the first and second displays respectively. When the computer program product is run on the at least one processing circuitry, it is further configured to cause the at least one processing circuitry to present at least one updated version of the computer-generated image data that is rendered under the presumption that at least one of the user's left and right eyes is located at a position being different from the first and second positions respectively in at least one spatial dimension. Moreover, when the computer program product is run on the at least one processing circuitry, it is configured to receive a user-generated feedback signal containing either a quality measure or a confirmation command. The quality measure expresses how the user perceives the updated version of the computer-generated image data relative to computer-generated image data presented previously on the first and second displays. When the computer program product is run on the at least one processing circuitry, it is configured to iterate the steps of presenting the updated version of the computer-generated image data and receiving the user-generated feedback signal until the user-generated feedback signal containing the confirmation command is received. Finally, when the computer program product is run on the at least one processing circuitry, it is configured to define the first and second positions for the user's left and right eyes respectively based on the user-generated feedback signal. The advantages of this computer program product and non-volatile data carrier are apparent from the discussion above with reference to the method performed in at least one processor.

According to yet another aspect of the invention, the above object is achieved by a binocular headset controller containing at least one processor that is configured to: present computer-generated image data on first and second displays of a binocular headset, the computer-generated image data being rendered under a presumption that a user's left eye is located at a first position relative to the first display and the user's right eye is located at a second position relative to the second display, and the computer-generated image data including at least one graphical element shown on the first and second displays respectively; present at least one updated version of the computer-generated image data that is rendered under the presumption that at least one of the user's left and right eyes is located at a position being different from the first and second positions respectively in at least one spatial dimension; receive a user-generated feedback signal containing either: a quality measure of the updated version of the computer-generated image data relative to computer-generated image data presented previously on the first and second displays, or a confirmation command; iterate the steps of presenting the updated version of the computer-generated image data and receiving the user-generated feedback signal until the user-generated feedback signal containing the confirmation command is received, and define the first and second positions based on the user-generated feedback signal. The advantages of this binocular headset controller is apparent from the discussion above with reference to the proposed method.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
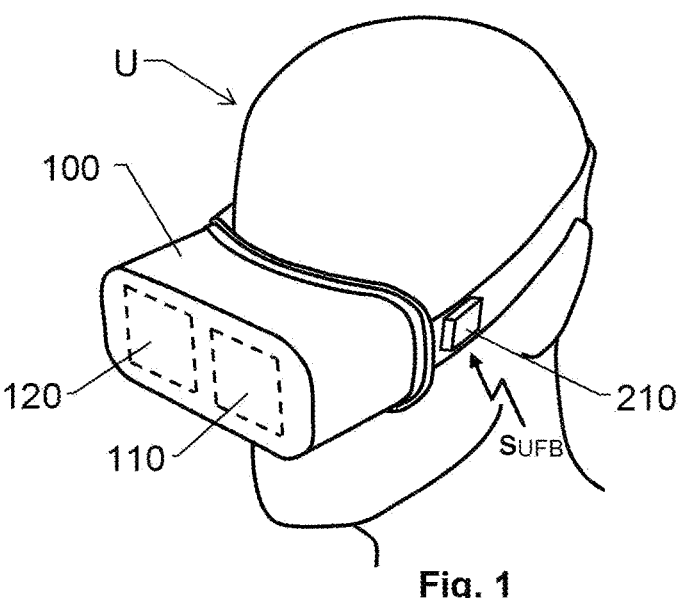
FIG. 1 illustrates a binocular headset in the form of an HMD in which the invention may be implemented.

FIG. 1 illustrates a binocular headset 100 in the form of an HMD in which the invention may be implemented. The illustrated binocular headset 100 is here of a closed type, which is most suitable for VR applications. Of course, however, the present invention is equally well applicable to other types of binocular headsets, e.g. of see-through type primarily intended for AR applications.

In any case, the binocular headset 100 has first and second displays 110 and 120 configured to present visual information to a user's U left and right eye respectively. The visual information, in turn, may be based on computer-generated image data as described below.

Figure 2:
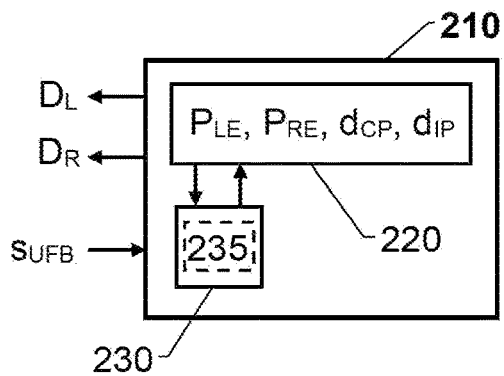
FIG. 2 shows block diagram over a binocular headset controller according to one embodiment of the invention.

FIG. 2 shows block diagram over a binocular headset controller 210 according to one embodiment of the invention. The binocular headset controller 210 may for example be implemented as a separate unit that can be attached to the binocular headset 100 as illustrated in FIG. 1. However, alternatively, the binocular headset controller 210 may be implemented as a part of another processing circuit, for instance included in a general-purpose computer. The binocular headset controller 210 contains at least one processor 220, which is configured to present computer-generated image data $D_L$ and $D_R$ on the first and second displays 110 and 120 of the binocular headset 100.

Figure 3:
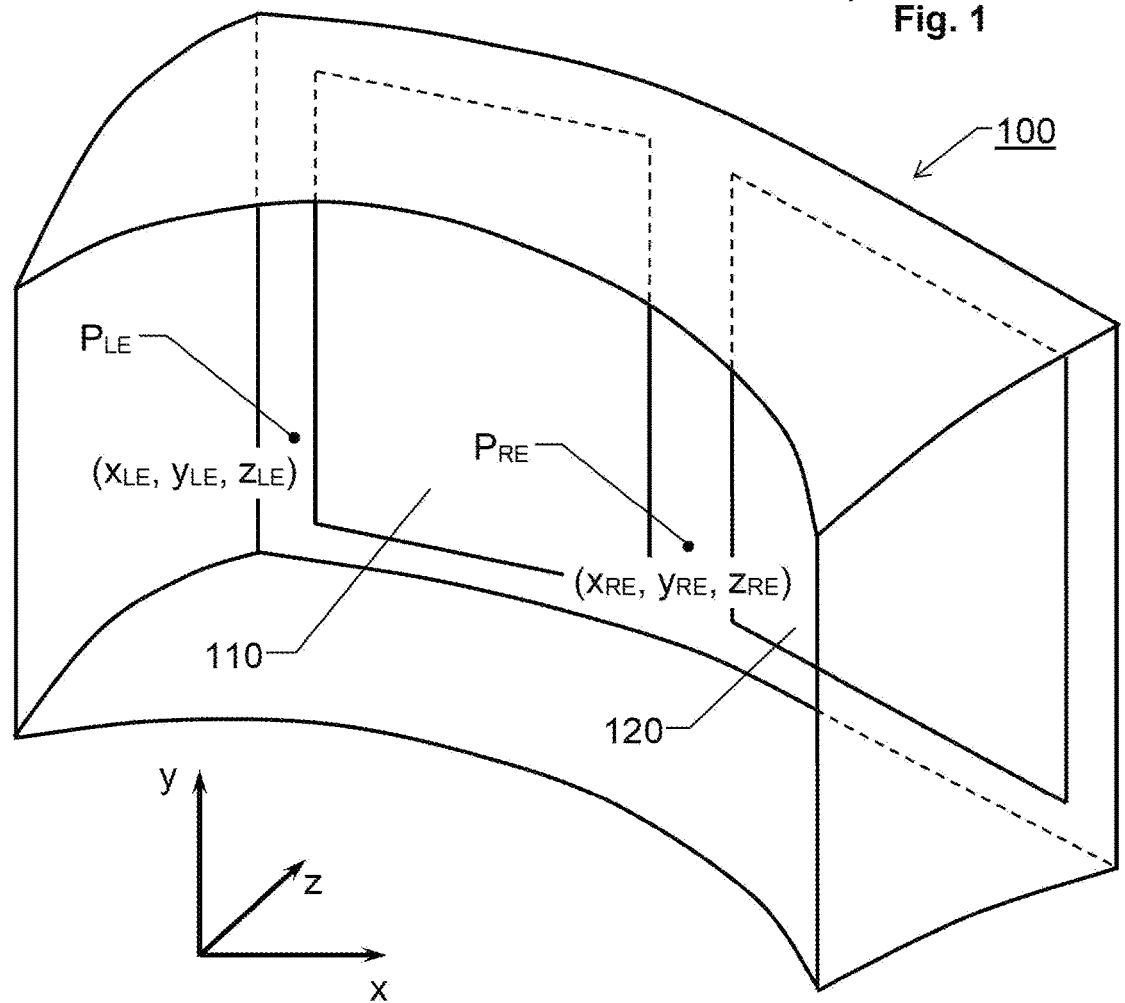
FIG. 3 illustrates schematically the positions of a user's eyes relative to a pair of displays in an HMD.

Referring now to FIG. 3, we see a schematic illustration of the binocular headset 100. The at least one processor 220 is configured to render the computer-generated image data $D_L$ and $D_R$ under a presumption that the user's U left eye is located at a first position $P_{LE}$ relative to the first display 110 and the user's U right eye is located at a second position $P_{RE}$ relative to the second display 120. The first and second positions $P_{LE}$ and $P_{RE}$ are defined by spatial coordinates $x_{LE}$, $y_{LE}$, $z_{LE}$ and $z_{RE}$, $y_{RE}$, $z_{RE}$ respectively relative to a coordinate system x, y, z for the binocular headset 100.

As will be discussed in further detail below, the computer-generated image data contains at least one graphical element that is shown on the first and second displays 110 and 120 respectively.

The at least one processor 220 is further configured to present at least one updated version of the computer-generated image data $D_L$ and $D_R$. The updated version is rendered under the presumption that at least one of the user's left and right eyes is located at a position being different from the first and second positions $P_{LE}$, and $P_{RE}$ respectively in at least one spatial dimension x, y and/or z.

The at least one processor 220 is also configured to receive a user-generated feedback signal $s_{UFB}$, for example over a wireless interface as illustrated in FIG. 1, which may be implemented by optic or radio technique, e.g. Wi-Fi, Bluetooth, BLE etc. The user-generated feedback signal $s_{UFB}$ either contains a quality measure or a confirmation command.

The quality measure expresses how the user U experiences the quality of the updated version of the computer-generated image data $D_L$ and $D_R$ relative to computer-generated image data $D_L$, and $D_R$ presented previously on the first and second displays 110 and 120. More precisely, the quality measure may express a degree of misalignment between the computer-generated image data $D_L$, and $D_R$ and the updated version thereof. Alternatively, or additionally, the quality measure may express a degree of skewedness between the computer-generated image data $D_L$ and $D_R$ and the updated version thereof.

The user-generated feedback signal $s_{UFB}$, as well as any updates thereof, may be caused by user input produced in response to manipulation of a button, a key or a touch sensor, controlling a pointing device, interaction with a gesture interface, and/or interaction with a voice interface.

The at least one processor 220 is configured to iterate the steps of presenting the updated version of the computer-generated image data $D_L$ and $D_R$ and receiving the user-generated feedback signal $s_{UFB}$ until the confirmation command is received as part of the user-generated feedback signal $s_{UFB}$. The user U is instructed to produce the confirmation command when he/she experiences that the computer-generated image data $D_L$ and $D_R$ is optimal, or at least reaches a quality standard acceptable by the user.

In some cases, it may be advantageous to present two or more updated versions of the computer-generated image data $D_L$ and $D_R$ before receiving the user-generated feedback signal $s_{UFB}$. For example, the at least one processor 220 may repeatedly generate different versions of the computer-generated image data $D_L$ and $D_R$. The user U then enters the confirmation command when he/she finds the quality of the image data acceptable.

According to one embodiment of the invention, the computer-generated image data $D_L$ and $D_R$ is presented for the user's U left and right eyes in a temporal parallel manner, i.e. the user U is prompted to evaluate the perceived quality of both the sets of image data $D_L$ and $D_R$ in parallel.

According to another embodiment of the invention, the computer-generated image data $D_L$ and $D_R$ is presented for the user's U left and right eyes in a temporal interleaved manner. This means that at least one iteration of presenting the updated version of the computer-generated image data $D_L$ and receiving the user-generated feedback signal $s_{UFB}$ is completed for a one of the user's U eyes, say his/her left eye. Thereafter at least one iteration of presenting the updated version of the computer-generated image data $D_R$ and receiving the user-generated feedback signal $s_{UFB}$ is completed for the user's U other eye, say his/her right eye. Then, at least one iteration of presenting the updated version of the computer-generated image data $D_L$ and receiving the user-generated feedback signal $s_{UFB}$ is completed for left eye. Naturally, after this, another round of iterations may follow in which at least one iteration of presenting the updated version of the computer-generated image data $D_L$ and receiving the user-generated feedback signal $s_{UFB}$ is completed for right eye, and so on.

In response to receiving the confirmation command, the at least one processor 220 is configured to define the first and second positions $P_{LE}$ and $P_{RE}$. Preferably, these positions are assigned equal to the latest presumed eye positions before receiving the confirmation command. According to one embodiment of the invention, an estimated left eye position for the user U is assigned based on the latest first position $P_{LE}$ presumed when rendering the computer-generated image data $D_L$ before receiving the user-generated signal $s_{UFB}$ containing the confirmation command. Analogously, an estimated right eye position for the user U is assigned based on the latest second position $P_{RE}$ presumed when rendering the computer-generated image data $D_R$ before receiving the user-generated signal $s_{UFB}$ containing the confirmation command.

Nevertheless, if the user U indicates an experienced image quality via the user-generated feedback signal $s_{UFB}$, it is preferable if, in a subsequent presenting of the updated version of the computer-generated image data $D_L$ and $D_R$, this data is based on the quality measure comprised in the user-generated feedback signal $s_{UFB}$ in such a way that the subsequent presenting is expected to result in a later received user-generated feedback signal $s_{UFB}$ comprising a further improved quality measure, or even the confirmation command. For example, if it has been found that reducing the horizontal distance x has led to gradually improved quality measures, a following update the computer-generated image data $D_L$ and $D_R$ is rendered under the presumption of a somewhat yet reduced horizontal distance x.

Conversely, in some cases, it may be advantageous to, in a subsequent presenting of the updated version of the computer-generated image data $D_L$ and $D_R$, base the rendering on the quality measure in such a way that the subsequent presenting is expected to result in a later received user-generated feedback signal $s_{UFB}$ comprising a lower quality measure. Namely, thereby it can be concluded which is the optimal position $P_{RE}$ and/or $P_{RE}$ in one or more dimensions.

Moreover, according to embodiments of the invention, the order in which the optimal, or good enough, positions $P_{RE}$ and/or $P_{RE}$ are determined may be varied.

For instance, one of the positions can be assigned before starting to find the other one. This may mean that the steps of presenting the updated version of the computer-generated image data $D_L$ and receiving the user-generated feedback signal $s_{UFB}$ are iterated until a user-generated feedback signal $s_{UFB}$ containing the confirmation command is received for one eye of the user's U eyes, say the left eye, before starting to iterate the steps of presenting the updated version of the computer-generated image data $D_R$ and receiving the user-generated feedback signal $s_{UFB}$ for the other eye, say the right eye.

Alternatively, the positions $P_{RE}$ and $P_{RE}$ can be assigned in a temporal parallel manner. This means that the steps of presenting the updated version of the computer-generated image data $D_L$ and $D_R$ and receiving the user-generated feedback signal $s_{UFB}$ are iterated until a user-generated feedback signal $s_{UFB}$ containing the confirmation command is received for the user's U both eyes, Of course, a hybrid approach may likewise be applied in which the computer-generated image data $D_L$ and $D_R$ is presented for the user's U left and right eyes in a temporal interleaved manner. Specifically, this may mean that at least one iteration of presenting the updated version of the computer-generated image data $D_R$ and receiving the user-generated feedback signal $s_{UFB}$ is completed for a first eye, say the right eye. Thereafter, at least one iteration of presenting the updated version of the computer-generated image data $D_L$ and receiving the user-generated feedback signal $s_{UFB}$ is completed for a second eye, say the left eye. Then, at least one iteration of presenting the updated version of the computer-generated image data $D_R$ and receiving the user-generated feedback signal $s_{UFB}$ is again completed for first eye, i.e. here the right eye.

Figure 5:
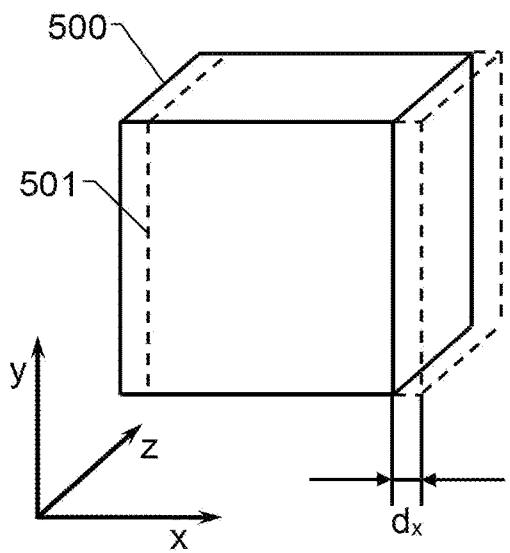
FIG. 5 shows a pair of virtual graphics cubes illustrating the effect of an incorrect horizontal virtual camera position when rendering virtual graphics.

Referring to FIG. 5, the effect of an incorrect horizontal virtual camera position when rendering virtual graphics will be described in relation to first and second virtual graphics cubes 500 and 501 respectively. As mentioned above, if both the virtual camera positions $P_{RE}$ and $P_{RE}$ are correct for the user's U eyes, the two virtual graphics cubes 500 and 501 can be rendered at different distances in such a manner that they completely overlap one another.

Here, let us assume that the first cube 500 is rendered at a shorter distance and the second cube 501 is rendered at a longer distance, and the sizes, the angular positions of the cubes 500 and 501 and said distances are such that the first cube 500 would be perceived to overlap the second cube 501 perfectly if the virtual camera positions $P_{RE}$ and $P_{RE}$ were correct for the user's U eyes.

However, if one or both of the positions of the virtual cameras is/are incorrect in a horizontal direction x in relation the respective display 110 and/or 120, the user will experience that there is a horizontal misalignment $d_x$ between the first and second cubes 500 and 501 as illustrated in FIG. 5. To reduce this effect, a subsequent iteration of presenting the computer-generated image data $D_L$ and $D_R$ should be rendered under a presumption that at least one of the user's U eyes is located at a position being shifted slightly in the horizontal direction x. Information about the sign and the magnitude of this shift as well as the eye(s) concerned is preferably derived further iterations of presenting the computer-generated image data $D_L$ and $D_R$.

Figure 6:
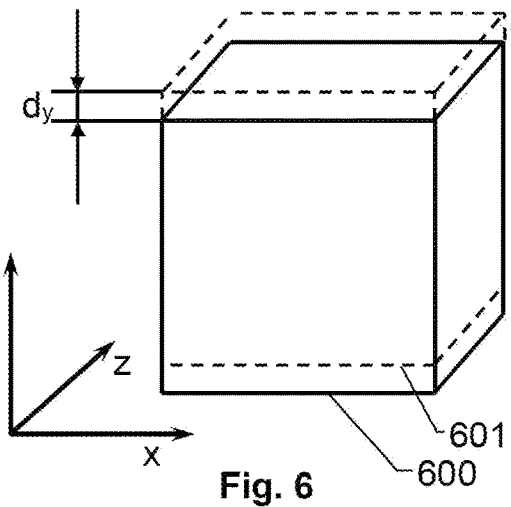
FIG. 6 shows a pair of virtual graphics cubes illustrating the effect of an incorrect vertical virtual camera position when rendering virtual graphics.

Analogously, if at least one of the virtual cameras' positions is incorrect in a vertical direction y in relation the respective display 110 and/or 120, the user will experience that there is a vertical misalignment $d_y$ between the virtual graphics objects 600 and 601 as illustrated in FIG. 6. In such a case, to reduce this undesired effect, a subsequent iteration of presenting the computer-generated image data $D_L$ and $D_R$ should be rendered under a presumption that at least one of the user's U eyes is located at a position being shifted slightly in the vertical direction y. Again, information about the sign and the magnitude of this shift as well as the eye(s) concerned may be derived by performing further iterations of presenting the computer-generated image data $D_L$ and $D_R$.

Figure 7A:
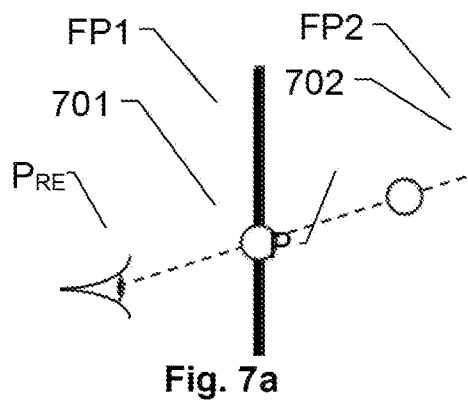
FIGS. 7a-b illustrate the effect resulting from an incorrect virtual camera position in the depth direction when rendering virtual graphics.
Figure 7B:
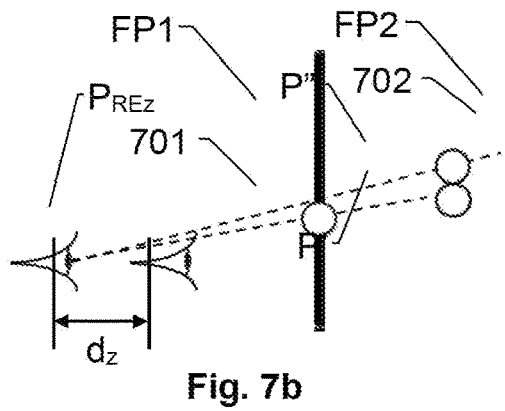
Figure 8:
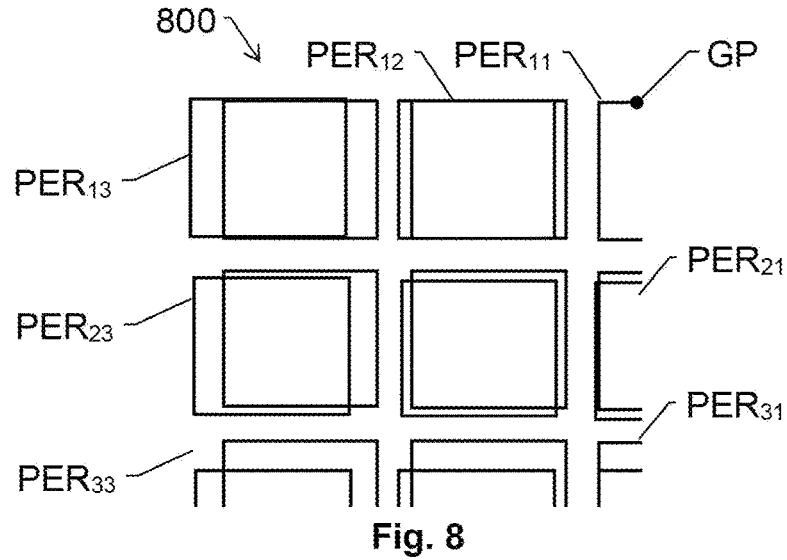
FIG. 8 illustrates the effect an incorrectly assumed distance between the eye's rotation center and pupil when rendering virtual graphics.

Referring to FIGS. 7a, 7b and 8, the effects of an incorrect virtual camera position in the depth direction z when rendering virtual graphics on different focus planes will be discussed. We will also describe how such effects are compensated for according to embodiments of the invention.

In FIG. 7a the position of the virtual camera coincides with the position $P_{RE}$ of the user's right eye. Consequently, a virtual graphics object 701 rendered on a first focal plane FP1 will be perceived to be located at the same position also if it is rendered 702 at a second focal plane FP2, namely at a position P on a straight line interconnecting the points 701 and 702.

In FIG. 7b, however, the position of the virtual camera does not coincide with the position $P_{RE}$ of the user's right eye. Here, the virtual camera position is shifted somewhat in the depth direction z relative to the position $P_{RE}$. As a result, when the virtual graphics object 701 stops being rendered on the first focal plane FP1 and instead is rendered as a virtual graphics object 702 on the second focal plane FP2, the user U will perceive a movement of the virtual graphics object from a first position P' to a second position P'''. Whether this movement appears to be up/down or left/right depends on the virtual graphics object's location on the display relative to user's U eye.

According to one embodiment of the invention, a misalignment between the position of the eye and the virtual camera in the depth direction z in a multi-focal plane implementation is estimated and compensated for by applying the following procedure.

The step of presenting the computer-generated image data $D_L$ and $D_R$ on the first and second displays 110 and 120 involves presenting a first graphical element 701 at a first focal plane FP1 on the first and second displays 110 and 120 respectively. A second graphical element 702 is presented at a second focal plane FP2 on the first and second displays 110 and 120 respectively. Here, the quality measure in the user-generated feedback signal $s_{UFB}$ is configured to indicate if the presenting of the first and second graphical elements 701 and 702 at the first and second focal planes FP1 and FP2 respectively is perceived by the user U as a change in position of the first and second graphical elements 701 and 702. For example, the quality measure may indicate a magnitude and/or a direction of any movement occurring. If the user U perceives no, or an acceptably small, movement he/she generates a feedback signal $s_{UFB}$ containing the confirmation command.

Figure 4:
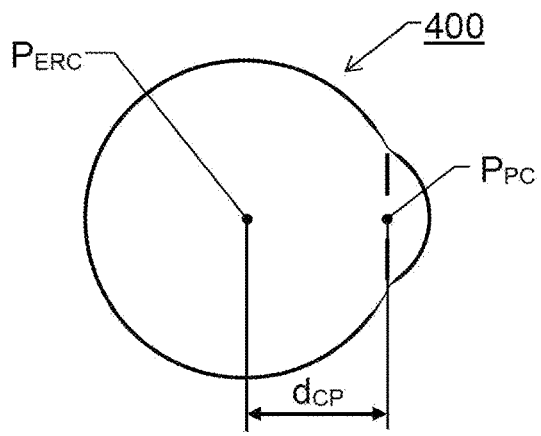
FIG. 4 illustrates the distance between a user's eye rotation center and the pupil of the same eye.

FIG. 4 illustrates the distance $d_{CP}$ between the eye rotation center $P_{ERC}$ and the pupil $P_{PC}$ of a user's U eye 400. To render the computer-generated virtual graphics on the first and second displays 110 and 120 of a binocular headset 100 in a fully correct and undistorted manner it is important that also the distance $d_{CP}$ is accurate for the user U in question. Namely, in each point in time, the specific content to render depends on which light rays from a particular display that are projected onto the user's retina. For a given gaze point, this, in turn, depends on the distance $d_{CP}$. It should be noted that the distance $d_{CP}$ is not a fixed measure for a particular user U. The distance $d_{CP}$ is dependent on the accommodation. Thus, preferably, the binocular headset 100 should be calibrated with respect to the distance $d_{CP}$ to allow for accommodation.

FIG. 8 illustrates, by means of an example, a possible effect as perceived by the user U if an assumed distance $d_{CP}$ between the eye's 400 rotation $P_{ERC}$ and the pupil $P_{PC}$ is assigned to an incorrect value when rendering computer-generated virtual graphics. Here, we assume that the user U is instructed to place his/her gaze point GP on the top right corner of a set of virtual graphics elements in the form of squares 800 that are rendered on each of the displays 110 and 120 respectively in such a manner that they would be perceived by the user U as being located on top of one another in a perfectly overlapping projection irrespective of where the user places his/her gaze point—provided that the assumed distance $d_{CP}$ is correct. In other words, the user U would here see a matrix of nine squares arranged in three straight columns with three squares in each of a respective straight row.

If, however, the assumed distance $d_{CP}$ is assigned to an incorrect value, i.e. the assumed distance $d_{CP}$ is too long or too short, the user U will experience misalignments in the peripheral view-field. This is illustrated in FIG. 8, where a square $PER_{11}$ located closest to the gaze point GP exhibits no discernible misalignment, squares $PER_{12}$ and $PER_{21}$ located relatively close to the gaze point GP exhibit relatively small misalignments and squares $PER_{23}$ and $PER_{21}$ located relatively far away from the gaze point GP exhibit relatively large misalignments. It should be noted that the degree of misalignment depends on the angular relationship to the gaze point GP, so that in the column containing the gaze point GP, there is essentially a vertical misalignment only; and analogously, in the row containing the gaze point GP, there is essentially a horizontal misalignment only. Consequently, maximal misalignment, in both the vertical and horizontal directions, occurs with respect to a square $PER_{33}$ located most remotely from the gaze point GP.

According to one embodiment of the invention, the step of presenting the computer-generated image data $D_L$ and $D_R$ on the first and second displays 110 and 120 respectively therefore involves presenting a two-dimensional pattern 800 of graphical elements at a same first focal distance FP1 on the first and second displays 110 and 120 respectively. The two-dimensional pattern 800 is presented under a presumption that, for at least one of the user's U left and right eyes, a center-pupil distance $d_{CP}$ separates the position $P_{ERC}$ of the eye rotation center from the position $P_{PC}$ of a pupil of the user's U eye. Here, the quality measure in the user-generated feedback signal $s_{UFB}$ reflects a degree of mismatch perceived by the user U between the two-dimensional pattern 800 presented on the first display 110 and the two-dimensional pattern 800 presented on the second display 120 when the user U focuses his/her gaze at a predefined point GP in the two-dimensional pattern 800.

In response to the quality measure, the step of presenting the updated version of the computer-generated image data $D_L$ and $D_R$ involves presenting the two-dimensional pattern 800 of graphical elements under the presumption that the center-pupil distance $d_{CP}$ is different from a previously assigned measure for this distance. Then, after having received the user-generated feedback signal $s_{UFB}$ containing the confirmation command is received, the method further involves assigning an estimated center-pupil distance $d_{CP}$ for the at least one of the user's U left and right eyes to the center-pupil distance $d_{CP}$ presumed latest before receiving the confirmation command.

According to another embodiment of the invention, the step of presenting the computer-generated image data $D_L$ and $D_R$ on the first and second displays 110 and 120 respectively further involves presenting a two-dimensional pattern 800 of graphical elements, for example in the form of squares, at a same second focal distance FP2 on the first and second displays 110 and 120 respectively. The same second focal distance FP2 is here different the same first focal distance FP1. The two-dimensional pattern 800 is presented under a presumption that, for at least one of the user's U left and right eyes, the above assigned estimated center-pupil distance $d_{CP}$ separates the position $P_{ERC}$ of the eye rotation center from the position $P_{PC}$ of the pupil of the user's U eye.

In response to the quality measure, the step of presenting the updated version of the computer-generated image data $D_L$ and $D_R$ on the displays 110 and 120 respectively involves presenting the two-dimensional pattern 800 of graphical elements under the presumption that the center-pupil distance $d_{CP}$ is different from a previously assigned estimated center-pupil distance $d_{CP}$.

Finally, after having received the user-generated feedback signal $s_{UFB}$ containing the confirmation command, the method involves assigning an enhanced estimated center-pupil distance $d_{CP}$ for the at least one of the user's U left and right eyes to the assigned center-pupil distance $d_{CP}$ presumed latest before receiving the confirmation command. Thereby, the user's center-pupil distance $d_{CP}$ can be determined very accurately in an efficient and straightforward manner.

To enable quick and convenient estimation of the key parameters for providing high-quality computer-graphics rendering in a for example a VR system, AR system or mixed reality (MR) system, it is useful to render different graphics objects or whole scenes with different choices of virtual camera positions during the calibration process, and allow the user U to choose the graphics object/scene that has the best perceived quality, i.e. the one with minimal degree of perceived misalignment and/or movement between different focus plane and view-points. Said key parameters comprise the spatial coordinates $x_{LE}$, $y_{LE}$, $z_{LE}$ and $x_{RE}$, $y_{RE}$, $z_{RE}$ for the first and second positions $P_{LE}$ and $P_{RE}$ respectively. Preferably, the distances $d_{CP}$ between the eyes' 400 rotation $P_{ERC}$ and the pupil $P_{PC}$ are also included in the key parameters as well as an interpupillary distance dip that will be described below with reference to FIGS. 9a and 9b.

Different subsets of the aspects of the virtual camera position may be presented to the user U, and different choices for the different aspects may be offered the user U. Typically, a combination of choices made by the user U for the different aspects of the virtual camera position provides a desired/adjusted/calibrated virtual camera position for the user U in question.

A certain order of the presentation of the virtual graphics objects/scenes may be imposed. Moreover, one and the same adjusted value(s) may be assigned for both eyes in a common procedure, or the eyes may be calibrated separately by for example blacking out one of the displays 110 or 120 and only considering one eye at a time. Of course, optionally, the eyes may be calibrated separately by presenting two different virtual camera positions and vary the virtual-camera parameters for the two eyes independently.

According to embodiments of the invention, many different types of virtual graphics object may be used for the above-mentioned calibration purposes.

One example of a basic virtual graphics object is a cube that is rendered with a certain virtual camera position. This basic virtual graphics object may be rendered at a centered position in the user's U field of view, and the user U can be offered different choices of the horizontal component x and the vertical component y for the virtual camera position. Further, the virtual graphics object can be rendered off center in the user's U field of view to offer the user U different choices of the depth component z for the virtual camera position. Namely, in general, offsets in the depth direction are more noticeable at off center positions for the virtual graphics objects than at center positions.

A number of graphical elements, for example in the form of cubes, may be rendered using different virtual camera positions, and where the graphical elements are presented in an organized fashion on the displays 110 and 120. Thereby, multiple choices for virtual camera positions may be presented to the user U at once, thus assisting the user U to quickly identity a virtual camera position that he/she finds the best in comparison to the other alternatives.

The horizontal position $x_{LE}$ and/or $x_{RE}$ and the vertical position $y_{LE}$ and/or $y_{RE}$ may be determined independently from one another by for example first presenting a virtual graphics object extending in the horizontal direction, and then presenting a virtual graphics object extending in the vertical direction, or vice versa.

Figure 11:
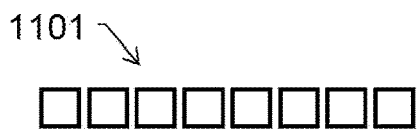
FIG. 11 shows a number of graphical elements to be presented to a user according to one embodiment of the invention to test if the virtual camera position is correct in the horizontal direction.
Figure 12:
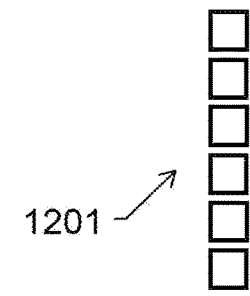
FIG. 12 shows a number of graphical elements to be presented to a user according to one embodiment of the invention to test if the virtual camera position is correct in the vertical direction.

According to one embodiment of the invention, the virtual graphics object is represented by at least one graphical element a rectilinear shape extending in two dimensions on each of the first and second displays 110 and 120 respectively. FIGS. 11 and 12 show two such examples in the form of a horizontal line of cubes 1101 suitable for determining the horizontal position $x_{LE}$ and/or $x_{RE}$ of the virtual camera respective a vertical line of cubes 1201 suitable for determining the vertical position $y_{LE}$ and/or $y_{RE}$ of the virtual camera.

Figure 13A:
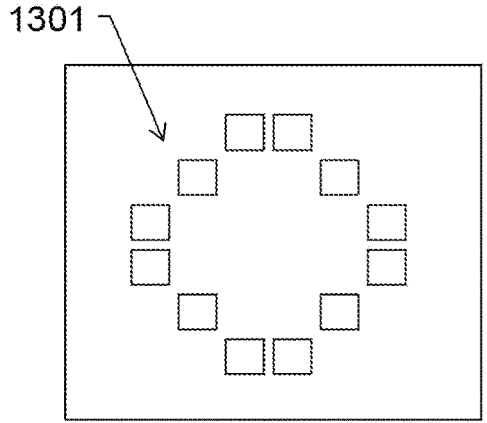
FIGS. 13a-14b show different examples of graphical elements to be presented to a user according to embodiments of the invention to test if the virtual camera position is correct in the horizontal and vertical directions.
Figure 13B:
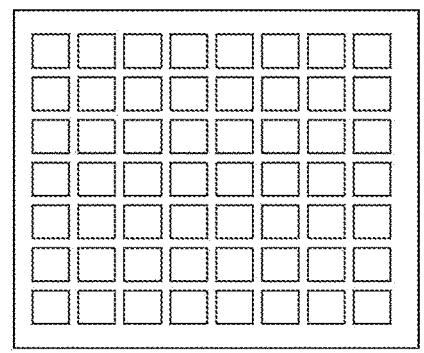

According to one embodiment of the invention, the at least one graphical element contains a number of graphical elements each having a rectilinear shape and extending in two dimensions, for example as illustrated by the ring of cubes 1301 in FIG. 13a and the matrix of cubes 1302 in FIG. 13b. Thus, the method of determining the virtual camera position may involve presenting a number of graphical elements as elements in at least one array as exemplified by the horizontal line of cubes 1101, the vertical line of cubes 1201 and the matrix of cubes 1302.

In many cases, it is desirable if the at least one graphical element includes a number of graphical elements, which each has a rectilinear shape and extends in two dimensions. The method of determining the virtual camera position may thus involve presenting a number of graphical elements as elements in a geometric symbol as exemplified by the ring of cubes 1301 in FIG. 13a that is mirror symmetric about at least two axes being mutually orthogonal.

Figure 14A:
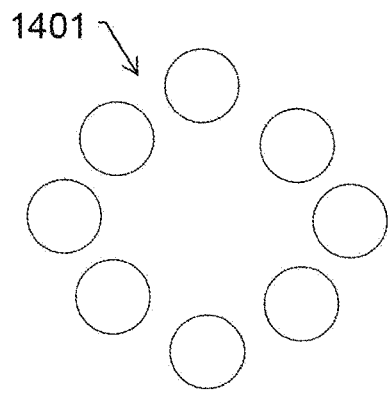
Figure 14B:
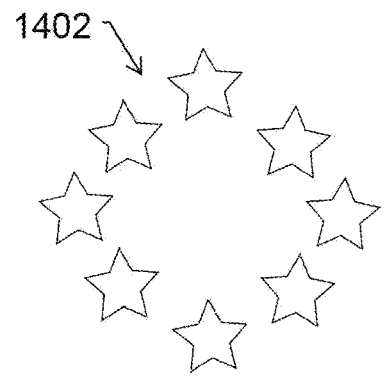

However, the virtual graphics object does not need to fulfil any such geometric requirements. On the contrary, according to embodiments of the invention, the at least one graphical element may contain a number of, preferably identical, graphical elements of any shape that are distributed over an area on the displays 110 and 120, for instance as exemplified by the arrangements of circles 1401 and stars 1402 in FIGS. 14a and 14b respectively.

Figure 9A:
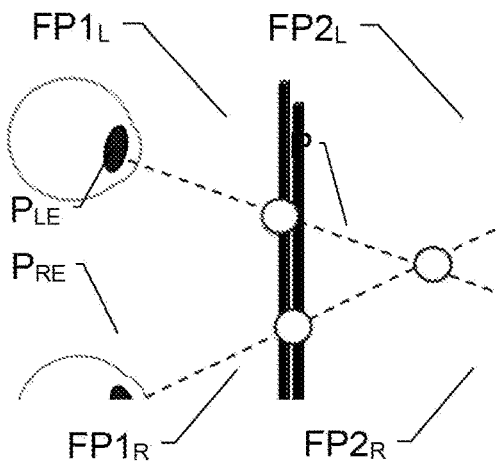
FIGS. 9a-b illustrate the effect resulting from an incorrect interpupillary distance when rendering virtual graphics.
Figure 9B:
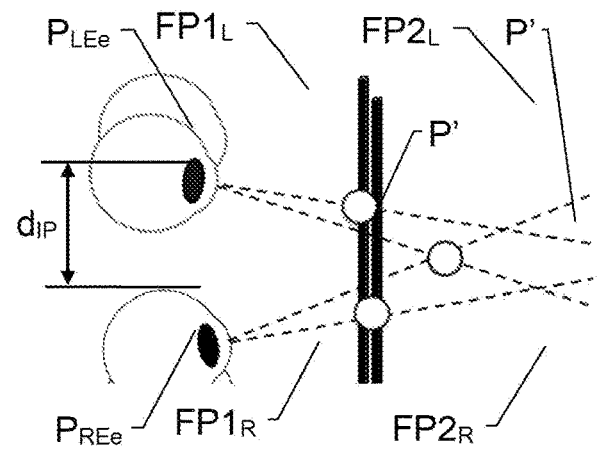

Referring now to FIGS. 9a and 9b, we will explain the effect the effect resulting from an incorrect interpupillary distance dip when rendering virtual graphics on the displays 110 and 120 of a binocular headset 100 for example forming part of a VR, AR or MR system, or a combination thereof.

FIG. 9a illustrates a situation where a correct interpupillary distance dip between the user's pupils $P_{LE}$ and $P_{RE}$ is used. This means that a particular virtual graphics object will be perceived by the user U to be located at a fixed position P irrespective of if the user U focuses on a respective first focal plane $FP1_L$ and $FP1_R$ or on a second focal plane $FP2_L$ and $FP2_R$.

If, however, the interpupillary distance dip between the user's pupils $P_{LEe}$ and $P_{REe}$ is incorrect, a jumping effect in the depth direction will be experienced by the user U when shifting focus between the first and second focal planes $FP1_L$ and $FP1_R$ respective $FP2_L$ and $FP2_R$ as illustrated in FIG. 9b.

To correct such a misalignment of the virtual camera position, according to one embodiment of the invention, after having received the user-generated feedback signal $s_{UFB}$ containing the confirmation command, the method further involves calculating an estimated interpupillary distance dip between the estimated left and right eye positions for the user U. The interpupillary distance dip calculated as an absolute distance between first and second coordinates, where the first coordinate expresses the first position $P_{LE}$ of a pupil $P_{PC}$ of the user's U left eye relative to the first display 110 and the second coordinate expressing the second position $P_{RE}$ a pupil $P_{PC}$ of the user's U right eye relative to the second display 120.

Figure 10A:
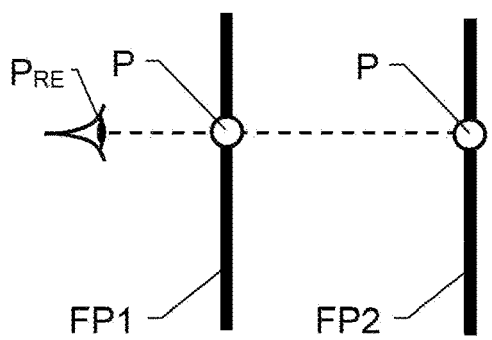
FIGS. 10a-b illustrate the effect resulting from incorrect horizontal and/or vertical position when rendering virtual graphics in a dual-focal plane design.

FIG. 10a illustrates a scenario when the horizontal/vertical position x or y respectively is correctly assumed when rendering virtual graphics in a design including first and second focal planes FP1 and FP2 respectively. As a result, a virtual graphics object will appear to be fixed at a position P regardless of if the user U focuses on the first focal plane FP1 or on the second focal plane FP2.

Figure 10B:
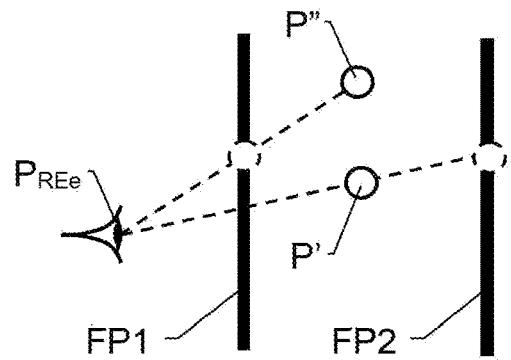

FIG. 10b illustrates the effect resulting from an incorrect horizontal and/or vertical position when rendering virtual graphics in a design including first and second focal planes FP1 and FP2 respectively. Here, virtual graphics object will appear to move from a first position P' to a second position P'' when the user U changes focus from the first plane FP1 to the second focal plane FP2.

Figure 15:
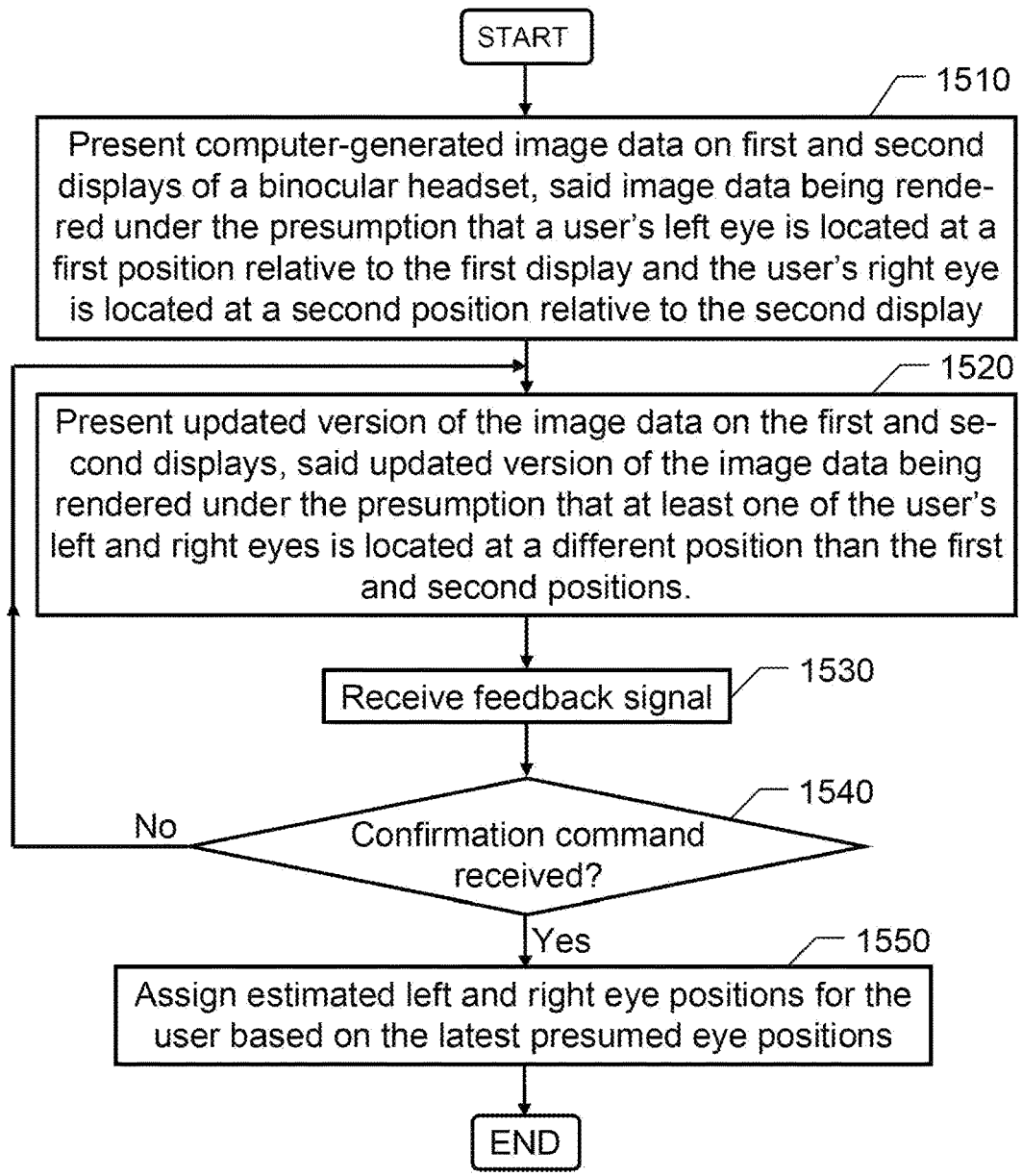
FIG. 15 illustrates, by means of a flow diagram, the general method according to the invention for calibrating the virtual-camera positions to the actual positions of the user's eyes.

In order to sum up, and with reference to the flow diagram in FIG. 15, we will now describe the general method according to the invention for calibrating the virtual-camera positions to the actual positions of the user's eyes.

In a first step 1510 computer-generated image data is presented on first and second displays of a binocular headset, for example forming part of a VR system, an AR system, an MR system, or some combination thereof. The computer-generated image data is rendered under a presumption that a user's left eye is located at a first position relative to the first display and the user's right eye is located at a second position relative to the second display. The computer-generated image data contain at least one graphical element, which is shown on both the first and second displays.

In a subsequent step 1520, at least one updated version of the computer-generated image data is presented on the first and second displays. The at least one updated version is rendered under the presumption that one, or both, of the user's is located at a position being different from the first and second positions in step 1510 in at least one spatial dimension.

Thereafter, in a step 1530, a user-generated feedback signal is received, which either contains a quality measure or a confirmation command. The quality measure expresses the user's experience of the at least one updated version of the computer-generated image data relative to computer-generated image data presented previously on the first and second displays, for example presented in step 1510 or in an earlier instance of step 1520. The confirmation command indicates that the user is satisfied with the quality experienced by the at least one updated version of the computer-generated image data. A subsequent step, 1540 checks if the user-generated feedback signal contains the confirmation command. If so, a step 1550 follows; and otherwise, the procedure loops back to step 1520.

In step 1550, the first and second positions for the left and right eyes respectively are defined based on the user-generated feedback signal. Specifically, this preferably means that the first and second positions are set to the positions presumed when rendering a latest version of computer-generated image data before receiving the confirmation command. Thereafter, the procedure ends.

All of the process steps, as well as any sub-sequence of steps, described with reference to FIG. 15 above may be controlled by means of at least one programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures but may be varied freely within the scope of the claims.

The invention claimed is:

1. A method performed in at least one processor, the method comprising:
presenting computer-generated image data on first and second displays of a binocular headset, the computer-generated image data being rendered under a presumption that a user's left eye is located at a first position relative to the first display and the user's right eye is located at a second position relative to the second display, and the computer-generated image data comprising at least one graphical element shown on the first and the second displays respectively;
presenting at least one updated version of the computer-generated image data that is rendered under the presumption that at least one of the user's left and right eyes is located at a position being different from the first and the second positions respectively in at least one spatial dimension;
receiving a user-generated feedback signal comprising either:
a quality measure of the updated version of the computer-generated image data relative to the computer-generated image data presented previously on the first and the second displays, or
a confirmation command;
iterating presenting the at least one updated version of the computer-generated image data and receiving the user-generated feedback signal until the user-generated feedback signal comprising the confirmation command is received, and
defining the first and the second positions based on the user-generated feedback signal.

2. The method according to claim 1, comprising:
presenting two or more updated versions of the computer-generated image data before receiving the user-generated feedback signal.

3. The method according to claim 1, wherein a subsequent presenting of the at least one updated version of the computer-generated image data is based on the quality measure comprised in the user-generated feedback signal such that the subsequent presenting is expected to result in a later received user-generated feedback signal comprising either (i) a further improved quality measure, or (ii) the confirmation command, or a lower quality measure.

4. The method according to claim 1, further comprising:
assigning an estimated left eye position for the user based on the latest first position presumed when rendering the computer-generated image data before receiving the user-generated signal comprising the confirmation command; and
assigning an estimated right eye position for the user based on a latest second position presumed when rendering the computer-generated image data before receiving the user-generated signal comprising the confirmation command.

5. The method according to claim 4, comprising:
iterating presenting the at least one updated version of the computer-generated image data and receiving the user-generated feedback signal until a user-generated feedback signal comprising the confirmation command is received for one eye of the user's left and right eyes before starting to iterate presenting the at least one updated version of the computer-generated image data and receiving the user-generated feedback signal for the other eye of the user's left and right eyes.

6. The method according to claim 4, wherein the computer-generated image data is presented for the user's left and right eyes (i) in a temporal parallel manner, or (ii) in a temporal interleaved manner, wherein:
at least one iteration of presenting the at least one updated version of the computer-generated image data and receiving the user-generated feedback signal is completed for a first eye of the user's left and right eyes, thereafter
at least one iteration of presenting the at least one updated version of the computer-generated image data and receiving the user-generated feedback signal is completed for a second eye of the user's left and right eyes, and then at least one iteration of presenting the at least one updated version of the computer-generated image data and receiving the user-generated feedback signal is completed for said first eye.

7. The method according to claim 1, wherein presenting the at least one updated version of the computer-generated image data comprises:
presenting a graphical element at a position being different from the first and the second positions respectively in a first spatial dimension, and
preferably presenting the at least one updated version of the computer-generated image data comprises:
presenting a graphical element at a position being different from the first and the second positions respectively in a second spatial dimension being orthogonal to the first spatial dimension.

8. The method according to claim 1, wherein the step of presenting the computer-generated image data on the first and the second displays comprises:
presenting a first graphical element at a first focal plane on the first and the second displays respectively, and
presenting a second graphical element at a second focal plane on the first and the second displays respectively, and wherein
the quality measure comprised in the user-generated feedback signal is configured to indicate when the presenting of the first and the second graphical elements at the first and the second focal planes respectively is perceived by the user as a change in position of the first and the second graphical elements.

9. The method according to claim 1, wherein at the at least one graphical element has a rectilinear shape extending in two dimensions on each of the first and the second displays respectively, and preferably a number of graphical elements are presented as elements in at least one array, or as elements in a geometric symbol being mirror symmetric about at least two mutually orthogonal axes.

10. The method according to claim 1, wherein the at least one graphical element comprises a number of identical graphical elements distributed over an area.

11. The method according to claim 1, after having received the user-generated feedback signal comprising the confirmation command, the method further comprising:
calculating an estimated interpupillary distance between the estimated left and right eye positions for the user as an absolute distance between first and the second coordinates, the first coordinate expressing the first position of a pupil of the user's left eye relative to the first display and the second coordinate expressing the second position a pupil of the user's right eye relative to the second display.

12. The method according to claim 11, wherein presenting the computer-generated image data on the first and the second displays comprises:
presenting a two-dimensional pattern of graphical elements at a same first focal distance on the first and the second displays, the two-dimensional pattern being presented under a presumption that, for at least one of the user's left and right eyes, a center-pupil distance separates a position of an eye rotation center from a position of a pupil of the user's eye, the quality measure comprised in the user-generated feedback signal reflecting a degree of mismatch perceived by the user between the two-dimensional pattern presented on the first display and the two-dimensional pattern presented on the second display when the user focuses his/her gaze at a predefined point in the two-dimensional pattern;
wherein in response to the quality measure, presenting the updated version of the computer-generated image data comprises:
presenting the two-dimensional pattern of graphical elements under the presumption that the center-pupil distance is different from a previously assigned measure for this distance; and
after having received the user-generated feedback signal comprising the confirmation command, the method further comprises:
assigning an estimated center-pupil distance for the at least one of the user's left and right eyes to the center-pupil distance presumed latest before receiving the user-generated feedback signal comprising the confirmation command.

13. The method according to claim 12, wherein the computer-generated image data is presented for the user's left and right eyes in a temporal parallel manner.

14. The method according to claim 12, comprising presenting the computer-generated image data for the user's left and right eyes in a temporal interleaved manner, wherein:
at least one iteration of presenting the updated version of the computer-generated image data and receiving the user-generated feedback signal is completed for a first eye of the user's left and right eyes,
thereafter at least one iteration of presenting the updated version of the computer-generated image data and receiving the user-generated feedback signal is completed for a second eye of the user's left and right eyes, and
then
at least one iteration of presenting the at least one updated version of the computer-generated image data and receiving the user-generated feedback signal is completed for the first eye.

15. The method according to claim 12, wherein presenting the computer-generated image data on the first and the second displays comprises:
presenting a two-dimensional pattern of graphical elements at a same second focal distance on the first and the second displays which same second focal distance is different the same first focal distance, the two-dimensional pattern being presented under a presumption that, for at least one of the user's left and right eyes, the assigned estimated center-pupil distance separates the position of the eye rotation center from the position of the pupil of the user's eye;
wherein in response to the quality measure, presenting the updated version of the computer-generated image data comprises:
presenting the two-dimensional pattern of graphical elements under the presumption that the center-pupil distance is different from a previously assigned estimated center-pupil distance; and after having received the user-generated feedback signal comprising the confirmation command, the method further comprises:
assigning an enhanced estimated center-pupil distance for the at least one of the user's left and right eyes to the assigned center-pupil distance presumed latest before receiving the user-generated feedback signal comprising the confirmation command.

16. The method according to claim 1 further comprising rendering the at least one updated version of the computer-generated image data under the presumption that at least one of the user's left and right eyes is located at a position being different from the first and the second positions respectively in two or more spatial dimensions.

17. The method according to claim 1, wherein the quality measure reflected by the user-generated feedback signal expresses at least one of:
- a degree of misalignment between the computer-generated image data and the updated version thereof, and
- a degree of skewedness between the computer-generated image data and the updated version thereof.

18. A computer program product comprising a non-transitory computer readable storage medium having program instructions embodied therewith, the program instructions being executable by a processor to cause the processor to:
- present computer-generated image data on first and second displays of a binocular headset, the computer-generated image data being rendered under a presumption that a user's left eye is located at a first position relative to the first display and the user's right eye is located at a second position relative to the second display, and the computer-generated image data comprising at least one graphical element shown on the first and the second displays respectively;
- present at least one updated version of the computer-generated image data that is rendered under the presumption that at least one of the user's left and right eyes is located at a position being different from the first and the second positions respectively in at least one spatial dimension;
- receive a user-generated feedback signal comprising either:
  - a quality measure of the updated version of the computer-generated image data relative to the computer-generated image data presented previously on the first and the second displays, or
  - a confirmation command;
- iterate presenting the at least one updated version of the computer-generated image data and receiving the user-generated feedback signal until the user-generated feedback signal comprising the confirmation command is received, and
- define the first and the second positions based on the user-generated feedback signal.

19. A binocular headset controller comprising at least one processor configured to:
- present computer-generated image data on first and second displays of a binocular headset, the computer-generated image data being rendered under a presumption that a user's left eye is located at a first position relative to the first display and the user's right eye is located at a second position relative to the second display, and the computer-generated image data comprising at least one graphical element shown on the first and the second displays respectively;
- present at least one updated version of the computer-generated image data that is rendered under the presumption that at least one of the user's left and right eyes is located at a position being different from the first and the second positions respectively in at least one spatial dimension;
- receive a user-generated feedback signal comprising either:
  - a quality measure of the at least one updated version of the computer-generated image data relative to the computer-generated image data presented previously on the first and the second displays, or a confirmation command;
- iterate presenting the updated version of the at least one computer-generated image data and receiving the user-generated feedback signal until the user-generated feedback signal comprising the confirmation command is received, and
- define the first and the second positions based on the user-generated feedback signal.

* * * * *